United States Patent [19]

Joslin

[11] 3,861,484
[45] Jan. 21, 1975

[54] HYBRID VEHICULAR POWER SYSTEM

[76] Inventor: Kenneth E. Joslin, 28811 Cove Crest Dr., Palos Verdes Peninsula, Calif. 90274

[22] Filed: Sept. 11, 1972

[21] Appl. No.: 288,069

Related U.S. Application Data

[63] Continuation of Ser. No. 111,196, Feb. 1, 1971, abandoned.

[52] U.S. Cl. ................................ 180/65 A, 74/675
[51] Int. Cl. .......................................... B60k 9/00
[58] Field of Search ............ 180/65 A; 74/686, 675; 290/14, 16

[56] References Cited
UNITED STATES PATENTS

| | | | |
|---|---|---|---|
| 1,081,643 | 12/1913 | Wills | 74/686 X |
| 1,515,321 | 11/1924 | Ahlm et al. | 74/686 |
| 1,870,076 | 8/1932 | Thomson | 74/686 X |
| 2,355,000 | 8/1944 | Liebrecht | 74/686 |
| 2,476,266 | 7/1949 | Trofimov | 74/675 X |
| 2,803,975 | 8/1957 | Akerman et al. | 74/686 |
| 2,908,189 | 10/1959 | Parker et al. | 74/675 |
| 2,924,991 | 2/1960 | Whiting | 74/675 |
| 2,998,538 | 8/1961 | O'Mahony | 74/675 X |
| 3,566,217 | 3/1971 | Berman et al. | 180/65 A X |
| 3,623,568 | 11/1971 | Mori | 180/65 A |

Primary Examiner—David Schonberg
Assistant Examiner—Milton L. Smith
Attorney, Agent, or Firm—Jessup & Beecher

[57] ABSTRACT

A hybrid drive system is provided for a vehicle whereby an internal combustion engine and an electric motor may be used to drive the vehicle; the tow motors being coupled to the drive shaft of the vehicle through a planetary gear transmission system. The planetary gear system permits full control to be achieved of the vehicular speed while the internal combustion engine is operated at constant speed, and it permits either the electric motor or the internal combustion engine, or both, to be used to drive the vehicle.

3 Claims, 3 Drawing Figures

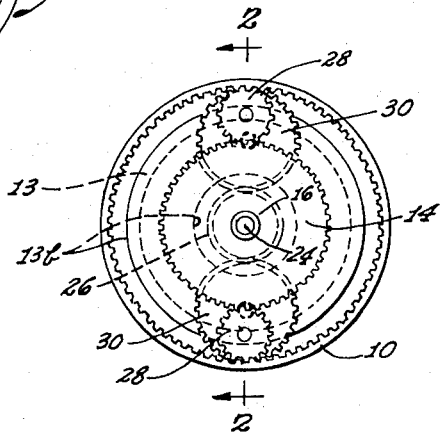
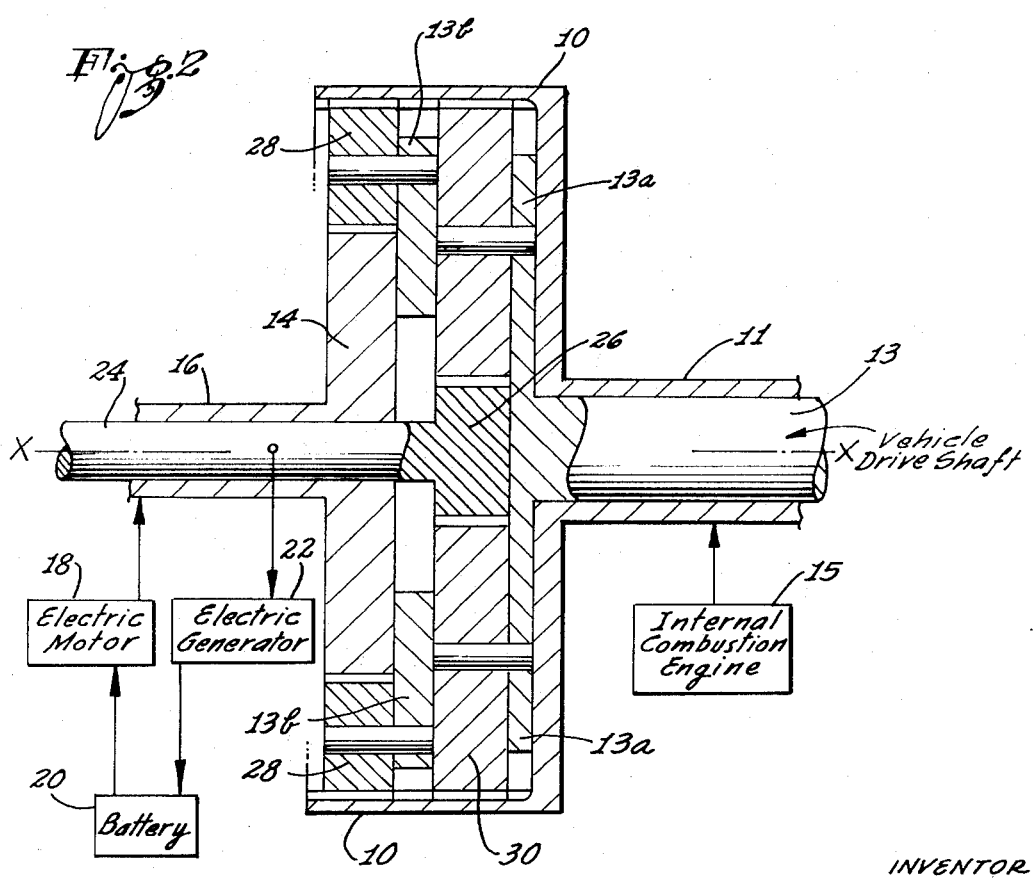

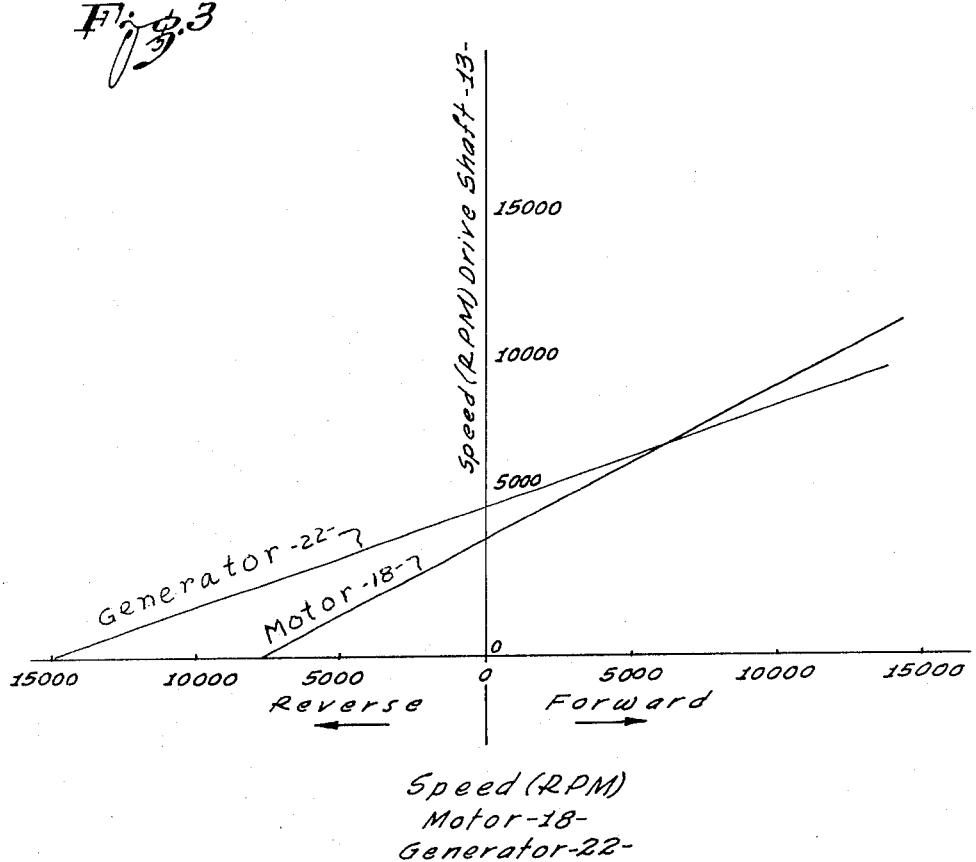

HYBRID VEHICULAR POWER SYSTEM

This application is a continuation of Copending Application Ser. No. 111,196 filed Feb. 1, 1971, now abandoned.

BACKGROUND OF THE INVENTION

The hybrid drive system of the present invention finds particular utility in motor vehicles since, as mentioned above, it permits the vehicle to be powered either by an electric motor alone, or by an internal combustion engine alone, if necessary or if desired. In addition, the system of the invention permits the internal combustion engine to be normally operated at essentially constant speed. This means that the internal combustion engine is much easier to control insofar as achieving a complete combustion of the fuel in the engine, so as to minimize pollution and maximize engine efficiency. It is known that most pollution problems, insofar as internal combustion engines are concerned, are caused from products of incomplete combustion being discharged through the exhaust pipe of the internal combustion engine during certain speed ranges and deceleration periods.

The power system of the invention, as will be described, is also advantageous in that all speed reduction and control, as well as all torque multiplication, are handled in the aforesaid planetary gear transmission system, so that no additional transmission system is necessarily required. Also, the normal constant speed utilization of the internal combustion engine means that an inexpensive, light weight, non-reciprocating, inherently low torque engine, such as the well known Wankel engine, can be used to advantage. Likewise, a light weight and relatively inexpensive electric motor may be used in the system because it is activated only intermittently, as will be described.

The power system of the invention is versatile in that any suitable combination of gearing may be incorporated into the planetary gear mechanism, depending upon the intended use of the vehicle.

BRIEF DESCRIPTION OF THE DRAWING

FIG. 1 is an end view of an appropriate planetary gear mechanism for use in the power system of the invention;

FIG. 2 is a side section of the planetary gear mechanism of FIG. 1, on an increased scale as compared therewith, and the various other components which make up the power system of the invention are shown in block form in FIG. 2; and FIG. 3 is a graph useful in explaining the operation of the power system of the invention.

DETAILED DESCRIPTION OF THE ILLUSTRATED EMBODIMENT

As shown in FIGS. 1 and 2, the illustrated planetary gear mechanism includes an internal gear member 10 which is rotatable about an axis X—X, and which is formed on one end of a hollow shaft 11 driven, for example, by an appropriate internal combustion engine, designated by the block 15. As mentioned above, the internal combustion engine 15 may be a non-reciprocating engine which is relatively light weight and inherently low torque, such as the well known Wankel engine. The Wankel engine is particularly appropriate because of its vibration free, quiet operating characteristics, and its constant speed design.

A shaft 13 is mounted coaxially within the hollow shaft 11 for rotation about the axis X—X. The shaft 13 may be coupled, for example, to the drive shaft of the vehicle, or it may constitute the vehicle drive shaft which provides output power to the wheels of the vehicle. A sun gear 14 is formed integral with, or attached to a hollow shaft 16, the hollow shaft 16 being rotatable about the axis X—X. The hollow shaft 16 is driven by an electric motor 18 which, as mentioned above, may be a light weight motor, since it is used only intermittently, under normal operation. The motor 18 is energized, for example, by an electric storage battery 20, which, in turn, is maintained in a charged condition by an electric generator 22.

The generator 22 is driven by a shaft 24, the shaft 24 extending within the hollow shaft 16, and also being rotatable about the axis X—X. A sun gear 26 is formed at one end of the shaft 24, or is coupled thereto.

The gear 14 engages a pair or triplet of planetary gears 28 which are rotatable mounted on a machined carrier 13a formed at one end of the shaft 13. The planetary gears 28 also engage the internal gear 10. The gear 26, on the other hand, engages a pair of planetary gears 30 which are rotatably mounted on a second carrier 13b. It will be appreciated that the first pair of planetary gears 28, and the second pair of planetary gears 30, are both rotatable with the carriers 13a and 13b and with the shaft 13 about the axis X—X. The carriers 13a and 13b are fixed to or integral with the shaft 13.

When the vehicle is standing still, and when the drive shaft 13 is braked, the internal combustion engine 15 drives the internal gear 10 at a constant speed. The electric motor 18 is de-energized under these conditions, and the internal combustion engine drives the electric generator 22 through the planetary gears 30, and through the gear 26 which causes the shaft 24 to rotate. The electric generator 22 under these conditions, therefore, is caused to charge the battery 20. An appropriate and known type of voltage regulator circuit may be interposed between the electric generator 22 and storage battery 20, as is usual in present day motor vehicles.

When forward motion is desired, the drive shaft 13 is released to supply power to the wheels. The load provided by the generator 22 on the raction shaft 24 at this time causes motion to be transmitted to the drive shaft 13 through the planetary gear system, because the gear 26 tends to impede the free rotation of the planetary gears 30. As the drive shaft 13 increases in speed, the reaction shaft 24 will slow down, and the generator 22 also will slow down to a point at which it os so inefficient that it can no longer provide the required reacting force to increase the vehicle speed any further. At this point, the battery power is applied to the electric motor 18 through an appropriate switching circuit, so that the electric motor provides the desired reaction torque through the shaft 16, the gear 14 and the planetary gears 28.

It will be appreciated that when the power system is idling, both the shafts 16 and 24 are rotated in the reverse direction, so that the electric generator 22 generates a charging current for the storage battery 20, as described above. During this condition, the electric motor 18 is driven in the reverse direction to its normal operation. Then, as power is applied to the wheels of the vehicle, and as the drive shaft 13 begins to rotate, the rotation of the shafts 24 and 16 reverses, and as mentioned above, power is applied to the electric motor 18 which causes it to rotate the shaft 16 in the forward direction, so that appropriate reaction may be applied through the planetary gear system to permit maximum speed to be achieved through the drive shaft 13. The generator 22 is also driven in the forward direction but is disconnected from the batteries. It will be appreciated during the aforesaid operations, the internal combustion engine 15 continues to be operated at essentially constant speed, so that the advantes designated above may be realized.

A particular example is represented by the graph of FIG. 3 in which different ratios are used for the drive of the generator 22 and motor 18. This permits the electric motor 18 to stop its reversed rotation and start is forward rotation while the generator 22 is still turning in its original charging reverse direction. This construction of different gear ratios eliminates the deadband which would otherwise occur when no further torque reaction is available from the generator while the electric motor is still turning in the reverse direction.

The graph of FIG. 3 represents a particular embodiment where the gear ratios were arbitrarily selected, and the graph represents the resulting speed of the drive shaft 13 with respect to the speeds of the motor 18 and generator 22 for a constant speed of the internal combustion engine 15.

In the particular embodiment represented by the graph of FIG. 3, the internal combustion engine 15 is assumed to be operating at a constant speed of 6000 rpm. Then, with the drive shaft 13 stopped, the generator speed is 15,000 rpm, and the motor speed is 7,200 rpm, both in the reverse direction.

Now, when the drive shaft 13 is rotating at 3,300 rpm, the speed of the generator 22 will be 4,000 rpm and the motor 18 will be stopped. When the drive shaft 13 is rotating at 6,000 rpm, however, both the motor and generator will also be rotating at 6,000 rpm in the forward direction.

It should be reitereated that in order to drive the shaft 13 by the internal combustion engine 15 alone, either the shaft 16 or the shaft 24 must be braked. Moreover, in order to drive the shaft 13 by the electric motor 18 alone, the internal combustion engine 15 must be prevented from back-driving. This latter criterion may be achieved by means of a one-way clutch or suitable braking device on the shaft of the internal combustion engine.

The invention provides, therefore, an improved and efficient power system for a vehicle, and one which is eminently suited for adequate control from a pollution standpoint. The power system of the invention, moreover, is relatively inexpensive to construct, and is highly efficient in its operation.

It will be appreciated, of course, that other gear assemblies apart from the mechanism illustrated in FIGS. 1 and 2 may be used. For example, the internal combustion engine 15 may drive a sun gear shaft with two fixed gears of different sizes, and the internal gear 10 may be separated with one side coupled to the generator 22 and with the other side coupled to the motor 18.

Therefore, although a particular embodiment of the invention has been shown and described, it is clear that modifications may be made, and it is intended in the following claims to cover all the modifications which fall within the spirit and scope of the invention.

What is claimed is:

1. A drive system for a vehicle, or the like, comprising: an electric motor; an internal combustion engine; a drive shaft for the vehicle; an electric generator; and gear means including a first section coupling said electric motor and said internal combustion engine to said drive shaft, and including a second section coupling said internal combustion engine to said electric generator to enable said internal combustion engine to drive said generator, in which said first section of said gear means includes planetary gear carrier means coupled to said drive shaft and rotatable therewith about the longitudinal axis of said drive shaft; a first plurality of planetary gears carried by said carrier means; an input shaft coaxial with said drive shaft and coupled to said electric motor; a first sun gear coupled to said input shaft and rotatable therewith about the longitudinal axis thereof and engaging said first plurality of planetary gears; and an internal toothed gear coupled to said internal combustion engine to be driven thereby and surrounding and engaging said planetary gears of said first plurality, in which said second section of said gear means includes a second plurality of planetary gears carried by said carrier means, said second plurality of planetary gears being spaced axially from said first plurality of planetary gears and engaging said internally toothed gear; a further input shaft coaxial with said first-named input shaft and coupled to said electric generator to drive said generator; and a second sun gear coupled to said further input shaft and rotatable therewith about the longitudinal axis thereof and engaging said second plurality of planetary gears.

2. The combination defined in claim 1, and which includes battery means electrically connected to said generator to be charged thereby and electrically connected to said electric motor to provide electric power for said motor.

3. The combination defined in claim 1, in which said first and second plurality of planetary gears are rotatable with said carrier means about the common longitudinal axis of said drive shaft and of said input reaction shaft.

* * * * *